(12) United States Patent
Lockwood

(10) Patent No.: US 7,142,644 B2
(45) Date of Patent: *Nov. 28, 2006

(54) ARRANGEMENT FOR CONVERTING TELEPHONE NUMBER FORMATS FOR NOTIFICATION SYSTEMS

(75) Inventor: Robert James Lockwood, Richmond, VA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/080,536

(22) Filed: Mar. 16, 2005

(65) Prior Publication Data

US 2005/0157857 A1  Jul. 21, 2005

Related U.S. Application Data

(63) Continuation of application No. 09/605,855, filed on Jun. 29, 2000, now Pat. No. 6,987,839.

(51) Int. Cl.
*H04M 1/64* (2006.01)

(52) U.S. Cl. .............................. 379/88.12; 379/211.02; 455/417

(58) Field of Classification Search ............. None
See application file for complete search history.

(56) References Cited

U.S. PATENT DOCUMENTS

| | | | |
|---|---|---|---|
| 4,996,707 A | | 2/1991 | O'Malley et al. |
| 5,050,208 A | * | 9/1991 | Wada ................. 379/100.09 |
| 5,506,894 A | | 4/1996 | Billings et al. |
| 5,742,905 A | | 4/1998 | Pepe et al. |
| 5,838,782 A | | 11/1998 | Lindquist |
| 5,859,901 A | | 1/1999 | Brendzel et al. |
| 5,940,490 A | | 8/1999 | Foster et al. |
| 6,167,429 A | * | 12/2000 | Mercer et al. ............. 709/203 |
| 6,208,870 B1 | | 3/2001 | Lorello et al. |
| 6,324,272 B1 | | 11/2001 | Abu-Shukhaidem et al. |
| 6,389,115 B1 | | 5/2002 | Swistock |
| 6,389,276 B1 | * | 5/2002 | Brilla et al. ............. 455/413 |
| 6,424,841 B1 | | 7/2002 | Gustafsson |
| 2002/0076009 A1 | | 6/2002 | Denenberg et al. |

* cited by examiner

*Primary Examiner*—Gerald Gauthier
(74) *Attorney, Agent, or Firm*—Leon R. Turkevich; Edward J. Stemberger

(57) ABSTRACT

A notification system includes a dial map configured for converting the destination telephone number within a notification message from an original format to another format recognizable by a messaging server, based on execution of a mapping rule selected based on a match between the mapping rule and the destination telephone number having the original format.

19 Claims, 2 Drawing Sheets

ARRANGEMENT FOR CONVERTING TELEPHONE NUMBER FORMATS FOR NOTIFICATION SYSTEMS

This application is a continuation of application Ser. No. 09/605,855, filed Jun. 29, 2000 now U.S. Pat. No. 6,987,839.

BACKGROUND OF THE INVENTION

1. Field of the Invention

The present invention relates to message notification systems configured for sending a notification message to a subscriber's destination telephone number.

2. Description of the Related Art

Short Message Services (SMS) have been implemented in wireless telephone communications systems as a way to send a message to a subscriber's cellular phone to notify the subscriber that he or she has received a new voice mail. A messaging server, also referred to as a Short Message Service Center (SMSC), is configured for receiving a notification message from a messaging source according to Short Message Peer to Peer Protocol (SMPP). The messaging source may be, for example, a voice mail system, a paging system, or an e-mail interface resident within the wireless telephone communications system. The SMSC, in response to receiving the notification message from the messaging source, transmits a short message to the cellular phone based on the destination telephone number specified within the notification message.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems enables service providers to use scalable and distributed systems using recognized communication protocols. Hence, the service providers may use such unified communications systems across multiple platforms, independent of protocol.

One disadvantage of the independent-type unified communications systems is compatibility between the unified communications system and the hardware deployed by the service provider. For example, a problem may arise if the unified communications system is configured for storing telephone numbers in one format (e.g., a national format), while the SMSC receiving the notification messages from the unified communications system is configured for utilizing telephone numbers in a different format (e.g., international format).

SUMMARY OF THE INVENTION

There is a need for an arrangement that resolves incompatibilities between telephone formats between a notification system and a messaging server, without the necessity of reconfiguring the telephone format within the notification system or the messaging server.

These and other needs are attained by the present invention, where a notification system includes a dial map configured for converting the destination telephone number within a notification message from an original format to another format recognizable by a messaging server, based on execution of a mapping rule selected based on a match between the mapping rule and the destination telephone number having the original format.

One aspect of the present invention provides a method in a notification system for sending a notification message for a user to a messaging server configured for identifying the user based on a destination telephone number in a first format. The method includes obtaining for the notification message a destination telephone number in a second format. The method also includes converting the destination telephone number in the second format to the destination telephone number in the first format based on execution of a mapping rule selected based on a match between the mapping rule and at least a portion of the destination telephone number in the second format. The notification message is then output having the destination telephone number having the first format. Converting the destination telephone number based on mapping rules enables user-defined pattern matching rules instead of number-specific conversions. Hence, the system can be programmed for different phone formats, providing flexibility for deployment.

Another aspect of the present invention provides a notification system configured for sending a notification message for a user to a messaging server, the messaging server configured for identifying the user based on a destination telephone number in a first format. The notification system includes a message interface configured for receiving the notification message and having the destination telephone number in a second format, a dial map and an output interface. The dial map is configured for converting the destination telephone number in the second format to the destination telephone number in the first format, the dial map executing a selected mapping rule based on a match between the mapping rule and at least a portion of the destination telephone number in the second format. The output interface is configured for outputting to the messaging server the notification message having the destination telephone number in the first format Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
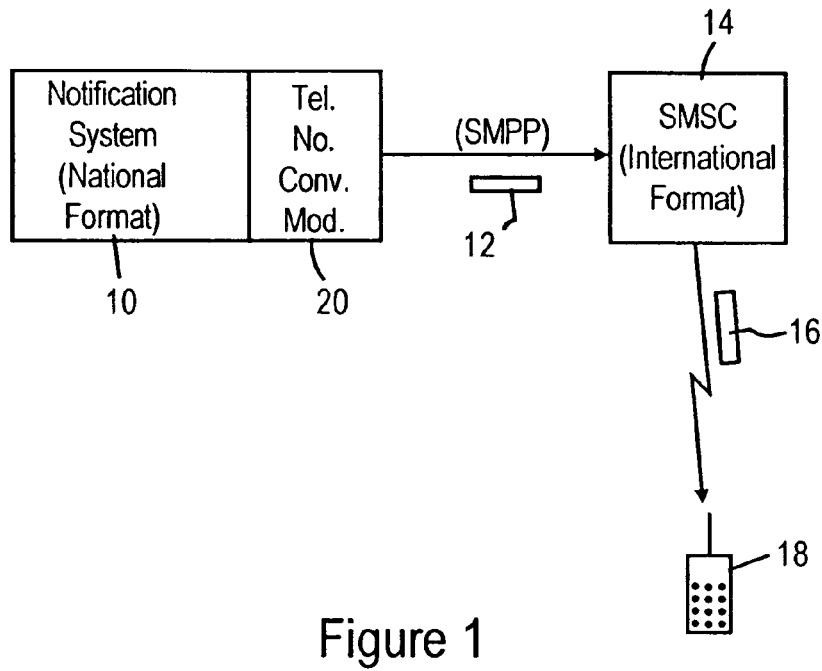
FIG. 1 is a diagram of a system utilizing a notification system and a messaging server for supplying a notification message to a user.

FIG. 1 is a diagram of a system utilizing a notification system and a messaging server for supplying a notification message to a user according to an embodiment of the present invention. The notification system 10 is preferably implemented as a web-based unified communications system configured for storing and managing voice, e-mail, or facsimile messages using an open standards architecture (e.g., Internet protocol). An example of the notification system 10 is the commercially-available uOne Unified Messaging System (Version 4.1) from Cisco Systems, Inc., San Jose, Calif.

The notification system 10 is configured for sending a notification message 12 to the messaging server 14, illustrated as an SMSC, via SMPP protocol. As recognized in the art, the SMSC 14 is configured for sending a wireless message 16 to a user's cellphone 18 based on the destination telephone number specified within the notification message 12.

According to the disclosed embodiment, a telephone number conversion module 20 is added to the notification system 10 to ensure that the notification message 12 sent to the messaging server 14 includes a destination telephone number that has a format recognizable by the messaging server 14. In particular, a service provider may need to store telephone numbers within the notification system 10 in one format (e.g., a country-specific format), even though the SMSC 14 is configured for processing SMPP messages according to another format (e.g., an international format that specifies a country code). Hence, the telephone number conversion module 20 is configured for converting the destination telephone number within the notification message from the country-specific format to the international format, eliminating the necessity for reprogramming of the notification system 10 with telephone numbers to match the requirements of the SMSC 14.

Figure 2:
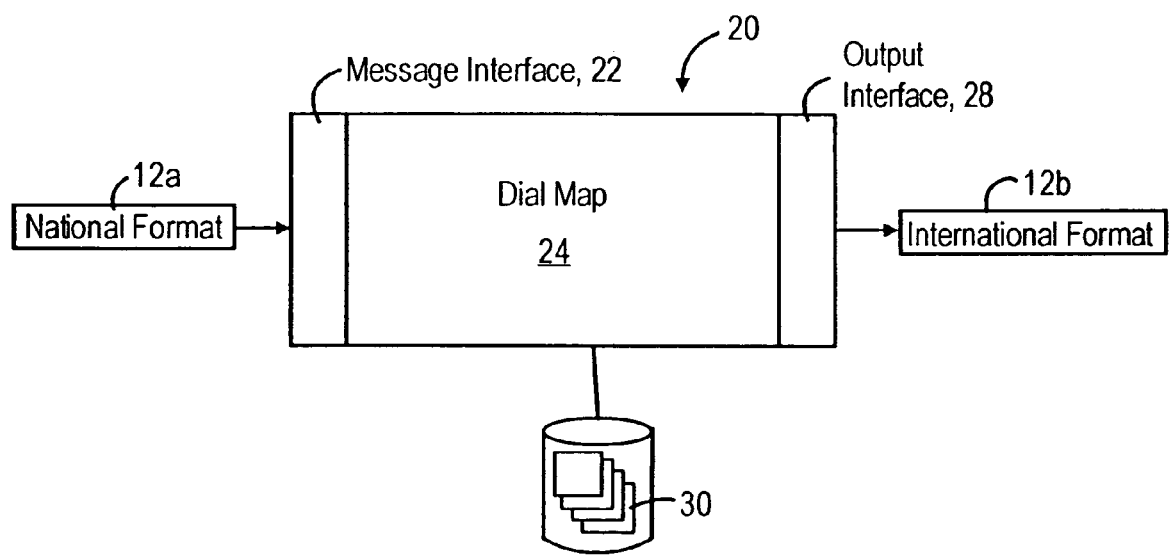
FIG. 2 is a diagram illustrating in detail the notification system of FIG. 1.
Figure 3:
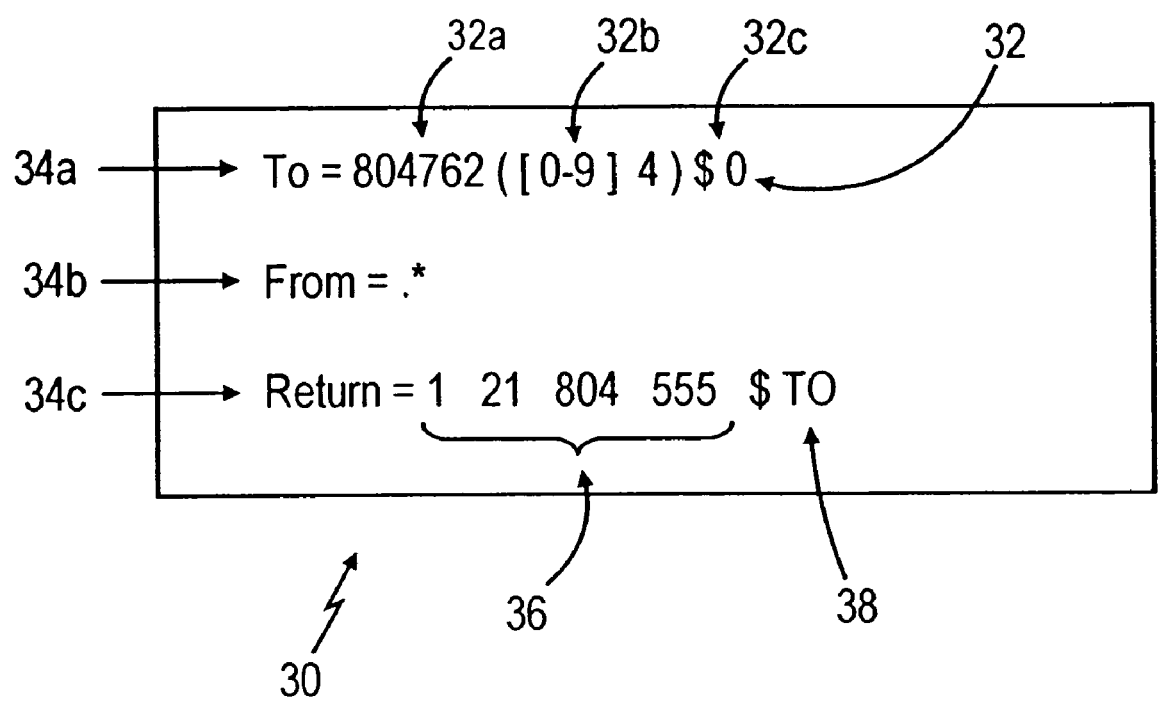
FIG. 3 is a diagram illustrating a mapping rule configured for converting telephone number formats according to an embodiment of the present invention.

FIG. 2 is a diagram illustrating in detail the telephone number conversion module 20 configured for executing selected mapping rules, illustrated in FIG. 3, according to an embodiment of the present invention. The operations described with respect to FIGS. 2 and 3 can be implemented as executable code that is stored on a computer readable medium (e.g., a hard disk drive, a floppy drive, a random access memory, a read only memory, an EPROM, a compact disk, etc).

The telephone number conversion module 20 includes a message interface 22 configured for receiving the notification message 12a generated by the notification system 10. In particular, the notification message 12a received by the message interface 22 includes source and destination telephone numbers in the format utilized by the notification system 10, for example a national-type, country-specific format such as the Numbering Plan Area (NPA) format utilized in the United States. The telephone number conversion module 20 also includes a dial map 24, for example an executable resource executed by a computer-based system, configured for converting the telephone numbers in the received notification message 12a into a format recognizable by the SMSC 14, for example an international format. As described in further detail below with respect to FIG. 3, the dial map 24 selects from a plurality of mapping rules 30 stored, for example, in a database 26. Once the dial map 24 converts the telephone numbers in the received notification message 12a into the format recognizable by the SMSC 14, an output interface 28 in the telephone number conversion module 20 outputs the converted notification message 12b having the converted telephone numbers to the SMSC 14 according to SMPP protocol.

FIG. 3 is a diagram illustrating in detail an exemplary mapping rule configured for converting a telephone number from a first telephone number format to another prescribed telephone number format according to an embodiment of the present invention. The mapping rule is implemented by specifying a regular expression term 32, illustrated as the term "804762([0–9]4)$0", within at least one field 34. The regular expression term 32 within the destination telephone number field 34a includes a prescribed telephone number pattern 32a (e.g., "804762") that is used by the dial map 24 to determine if there is a match between a telephone number and the corresponding mapping rule 30. The regular expression term 32 also includes an operand 32b "([0–9]4)" that specifies the nature of the comparison with the prescribed pattern 32a and a field identifier 32c (e.g., "$0"). In particular, the illustrated operand 32b specifies that the dial map 24 can accept any digits from 0 to 9, with up to four digits remaining; hence, the term 32 will match any telephone number that starts with "804 762", and that has four more digits.

As illustrated in FIG. 3, the source telephone number field 34b has an asterisk (*), indicating a don't care for the comparison by the dial map 24.

The return field 34c specifies the second number format to be utilized for the outgoing notification message 12b, and includes format-specific digits 36 ("1 21 804 555") and a string identifier 38 ("$T0"), which references identifier 0 in the To: field, i.e., the last four digits of the incoming message 12a. Hence, the mapping rule 30 would convert the telephone number "804 762 0000" from the NPA format to the international format "1 21 804 555 0000".

As apparent from the foregoing, the dial map 24 searches for a match between the destination telephone number within the received notification message 12a and the mapping rules 30 stored in the database 26, and executes a selected mapping rule 30 based on a match between the mapping rule and at least a portion of the destination telephone number in the received notification message 12a. Hence, multiple rules may be implemented for different telephone numbers, enabling the conversion of numbers to different formats depending on the number prefixes. Hence, the dial map 24 may access different mapping rules 30, enabling the messaging server 14 to serve multiple countries having respective telephone number formats.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a system for sending a notification message for a user identified based on a destination telephone number in a first telephone number format, the method including:
   in a communications system:
   (1) obtaining for the notification message a destination telephone number in a second telephone number format;
   (2) converting the destination telephone number in the second telephone number format to the destination telephone number in the first telephone number format based on execution of a mapping rule selected based on a match between the mapping rule and at least a portion of the destination telephone number in the second telephone number format, the converting including matching the mapping rule and the at least a portion of the destination telephone number in the second telephone number format based on a prescribed pattern within the destination telephone number in the second telephone number format; and (3) outputting the notification message having the destination telephone number having the first telephone number format;

in a messaging server:
(1) receiving the notification message;
(2) identifying the user based on the destination telephone number in the first telephone number format; and
(3) sending the notification message to a destination device of the user based on the destination telephone number in the first telephone number format.

2. The method of claim 1, wherein the outputting step includes outputting the notification message to the messaging server according to Short Message Peer to Peer (SMPP) protocol.

3. The method of claim 2, wherein the messaging server is a Short Message Service Center configured for sending the notification message to a wireless telephone corresponding to the destination telephone number having the first telephone number format.

4. The method of claim 3, wherein the first telephone number format is an international telephone number format, and the second telephone number format is a national telephone number format.

5. The method of claim 1, wherein the matching step includes determining the prescribed pattern from a specified regular expression, within the matched mapping rule, that specifies the prescribed pattern.

6. The method of claim 5, wherein the converting step further includes replacing the at least a portion of the destination telephone number in the second telephone number format with a replacement value specified in the matched mapping rule.

7. The method of claim 6, wherein the first telephone number format is an international telephone number format, and the second telephone number format is a national telephone number format.

8. A system configured for sending a notification message for a user identified based on a destination telephone number in a first telephone number format, the system including:
a notification system configured for generating a notification message for the user by specifying the destination telephone number in a second telephone number format; and
a conversion module for converting the destination telephone number into the first telephone number format from the second telephone number format, the conversion module comprising:
(1) a dial map configured for converting the destination telephone number in the second telephone number format to the destination telephone number in the first telephone number format, the dial map executing a selected mapping rule based on a match between the mapping rule and at least a portion of the destination telephone number in the second telephone number format, the dial map configured for storing a plurality of the mapping rules, each mapping rule specifying a corresponding first expression, and a corresponding second expression having the first telephone number format, the dial map selecting the selected mapping rule based on a match between the destination telephone number having the second telephone number format and the corresponding first expression; and
(2) an output interface configured for outputting the notification message having the destination telephone number in the first telephone number format.

9. The system of claim 8, wherein the output interface is configured for outputting the notification message according to Short Message Peer to Peer (SMPP) protocol.

10. The system of claim 8, wherein the dial map selects the selected mapping rule based on the corresponding first expression specifying a regular expression having a specified pattern that matches the at least a portion of the destination telephone number having the second telephone number format.

11. The system of claim 8, further comprising a messaging server configured for receiving the notification message having the destination telephone number in the first telephone number format, the messaging server configured for identifying the user based on the destination telephone number in the first telephone number format, and sending the notification message to a destination device of the user based on the destination telephone number in the first telephone number format.

12. The system of claim 11, wherein the output interface is configured for outputting the notification message, and the messaging server is configured for receiving the notification message, according to Short Message Peer to Peer (SMPP) protocol.

13. The system of claim 8, wherein the first telephone number format is an international telephone number format, and the second telephone number format is a national telephone number format.

14. A system configured for sending a notification message for a user identified based on a destination telephone number in a first telephone number format, the system including:
notification means for generating a notification message for the user by specifying the destination telephone number in a second telephone number format; and
conversion means for converting the destination telephone number into the first telephone number format from the second telephone number format, the conversion means comprising:
(1) mapping means for mapping the destination telephone number in the second telephone number format to the destination telephone number in the first telephone number format, the mapping means executing a selected mapping rule based on a match between the mapping rule and at least a portion of the destination telephone number in the second telephone number format, the mapping means configured for storing a plurality of the mapping rules, each mapping rule specifying a corresponding first expression, and a corresponding to second expression having the first telephone number format, the mapping means selecting the selected mapping rule based on a match between the destination telephone number having the second telephone number format and the corresponding first expression; and
(2) output means for outputting the notification message having the destination telephone number in the first telephone number format.

15. The system of claim 14, wherein the output interface is configured for outputting the notification message according to Short Message Peer to Peer (SMPP) protocol.

16. The system of claim 14, wherein the mapping means selects the selected mapping rule based on the corresponding first expression specifying a regular expression having a specified pattern that matches the at least a portion of the destination telephone number having the second telephone number format.

17. The system of claim 14, further comprising messaging means for:

receiving the notification message having the destination telephone number in the first telephone number format, identifying the user based on the destination telephone number in the first telephone number format, and sending the notification message to a destination device of the user based on the destination telephone number in the first telephone number format.

18. The system of claim 17, wherein the output means is configured for outputting the notification message, and the messaging means is configured for receiving the notification message, according to Short Message Peer to Peer (SMPP) protocol.

19. The system of claim 14, wherein the first telephone number format is an international telephone number format, and the second telephone number format is a national telephone number format.

* * * * *